(12) United States Patent
Freed et al.

(10) Patent No.: US 10,430,465 B2
(45) Date of Patent: Oct. 1, 2019

(54) DYNAMIC FACETING FOR PERSONALIZED SEARCH AND DISCOVERY

(71) Applicant: INTERNATIONAL BUSINESS MACHINES CORPORATION, Armonk, NY (US)

(72) Inventors: Andrew R. Freed, Cary, NC (US); Norbert Herman, Denver, CO (US); Shubhadip Ray, Secaucus, NJ (US); Avik Sanyal, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 15/398,224

(22) Filed: Jan. 4, 2017

(65) Prior Publication Data
US 2018/0189417 A1 Jul. 5, 2018

(51) Int. Cl.
*G06N 20/00* (2019.01)
*G06F 16/903* (2019.01)
*G06F 16/9032* (2019.01)

(52) U.S. Cl.
CPC .... *G06F 16/9032* (2019.01); *G06F 16/90335* (2019.01); *G06N 20/00* (2019.01)

(58) Field of Classification Search
CPC ......... G06F 17/30967; G06F 17/30979; G06F 3/0482; G06F 16/9032; G06F 16/90335; G06N 99/005; G06N 20/00
See application file for complete search history.

(56) References Cited

U.S. PATENT DOCUMENTS

| | | | |
|---|---|---|---|
| 7,392,250 B1 | 6/2008 | Dash et al. | |
| 9,336,314 B2 | 5/2016 | Lam | |
| 9,348,894 B2 | 5/2016 | Asadullah et al. | |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2006/0294071 A1 | 12/2006 | Weare et al. | |
| 2008/0027924 A1* | 1/2008 | Hamilton | G06F 17/30867 |

(Continued)

OTHER PUBLICATIONS

"Big Data at the Speed of Business", [retrieved on Sep. 4, 2016]. Retrieved from the Internet: <URL: https://www-01.ibm.com/software/data/bigdata/use-cases/enhanced360.html>, IBM Software Information Management InfoSphere Platform, 2 pgs.

(Continued)

*Primary Examiner* — Jay A Morrison
(74) *Attorney, Agent, or Firm* — Brian Restauro, Esq.; Hye Jin Lucy Song; Heslin Rothenberg Farley & Mesiti P.C.

(57) ABSTRACT

Methods, computer program products, and systems are presented. The methods include, for instance: determining user clusters and navigation-type clusters based on multiple information requests, and training facets and corresponding usefulness factor of the facets from the multiple information requests by machine learning. When a user submits a query, the user and the query is respectively mapped with one of the user clusters and the navigation-type clusters, and the query is customized based on the associated pair of clusters. Results of the query are obtained, ranked by usefulness of the facets as determined according to the pair of clusters, and presented to the user.

20 Claims, 6 Drawing Sheets

(56) References Cited

U.S. PATENT DOCUMENTS

| | | | |
|---|---|---|---|
| 2008/0301541 A1* | 12/2008 | Karidi | G06F 17/30896 715/206 |
| 2013/0024440 A1 | 1/2013 | Dimassimo et al. | |
| 2013/0297590 A1* | 11/2013 | Zukovsky | G06F 17/30867 707/722 |
| 2014/0025626 A1 | 1/2014 | Mefford et al. | |
| 2015/0154264 A1 | 6/2015 | Lightner et al. | |
| 2016/0179933 A1 | 6/2016 | Dimassimo et al. | |

OTHER PUBLICATIONS

Anonymous, "Automatic Discovery of Product Trends from Site-Specific Personalized Search History", IP.com No. IPCOM000213631D, Dec. 23, 2011, 3 pgs.

Anonymous, "System and Framework for Facilitating Faceted Interaction with Data from Different Data Sources", IP.com No. IPCOM000199917D, Sep. 21, 2010, 23 pgs.

Tvarožek, Michal, et al., "Improving Semantic Search Via Integrated Personalized Faceted and Visual Graph Navigation", SOFSEM 2008 Proceedings: Theory and Practice of Computer Science, 34th Conference on Current Trends in Theory and Practice of Computer Science, Nový Smokovec, Slovakia, Jan. 19-25, 2008, 13 pgs.

Tvarožek, Michal, et al., "Personalized Faceted Navigation for Multimedia Collections", Second International Workshop on Semantic Media Adaptation and Personalization, IEEE, DOI 10.1109/SMAP.2007.28, 2007, pp. 104-109.

Tvarožek, Michal, et al., "Collaborative Multi-Paradigm Exploratory Search", WebScience'08, Jun. 2008, Pittsburgh, PA, 5 pgs.

Tvarožek, Michal, et al., "Personalized Faceted Navigation in the Semantic Web." Retrieved from the Internet: <URL: http://citeseerx.ist.psu.edu/viewdoc/download?doi=10.1.1.439.999&rep=rep1&type=pdf>, 5 pgs.

Luxenburger, Julia, et al., "Matching Task Profiles and User Needs in Personalized Web Search", CIKM '08 Proceedings of the 17th ACM conference on Information and knowledge management, Napa Valley, California, USA, 2008, pp. 689-698.

Urad, Zeina, et al., "A Contextual User Model for Web Personalization", vol. 4832 of the series Lecture Notes in Computer Science, WISE 2007 Workshops, 2007, pp. 350-361.

Mell, Peter, et al., "The NIST Definition of Cloud Computing", NIST Special Publication 800-145, Sep. 2011, Gaithersburg, MD, 7 pgs.

* cited by examiner

FIG. 6

## DYNAMIC FACETING FOR PERSONALIZED SEARCH AND DISCOVERY

TECHNICAL FIELD

The present disclosure relates to information retrieval and data mining, and more particularly to methods, computer program products, and systems for customizing search and discovery by use of dynamic faceting of various aspects of users and requests.

BACKGROUND

In conventional search engines, facet dimensions are predetermined before building a search index, and facet values are driven by data provided for the search index according to operations of the search engines. Accordingly, dimensions and values of the facets remain static and uniformly applied to all users of the search engines.

SUMMARY

The shortcomings of the prior art are overcome, and additional advantages are provided, through the provision, in one aspect, of a method. The method for personalizing a query by use of dynamic faceting includes, for example: identifying, by one or more processor of a computer, at least one user cluster based on respective intent from multiple requests for information including searches and discoveries, wherein each intent corresponds to a specific characterization of users in respective user cluster; specifying at least one navigation-type cluster based on respective navigation pattern from the multiple requests for information; training, by machine learning, at least one facets and usefulness factors respectively associated with the at least one facets, as determined for each pair of a user cluster and a navigation-type cluster, wherein the user cluster is one of the at least one user cluster and the navigation-type cluster is one of the at least one navigation-type cluster, and presenting the at least one facets to a user belonging to the user cluster; customizing a query received from a user by use of one or more selected facet and corresponding associated usefulness factor, the one or more selected facet corresponding to a selected pair from the at least one user cluster and the at least one navigation-type cluster such that the user receives a response most appropriate for an intent of the query; and producing results responsive to the query, wherein the facets in the results are scored according to the usefulness factor respectively corresponding to the one or more selected facet.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
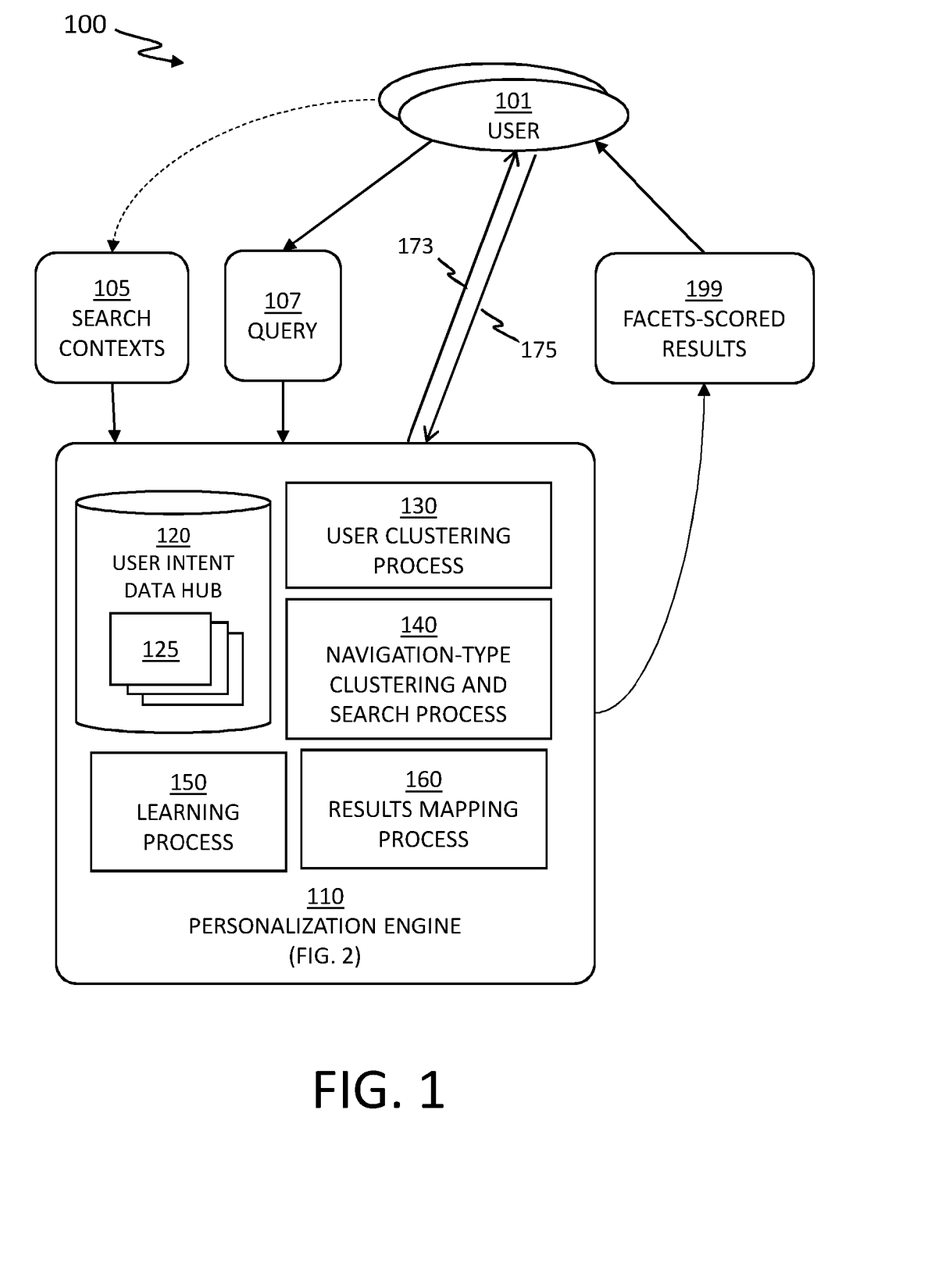
FIG. 1 depicts a system for dynamic faceting for personalized search and discovery, in accordance with one or more embodiments set forth herein.

FIG. 1 depicts a system 100 for dynamic faceting for personalized search and discovery, in accordance with one or more embodiments set forth herein.

The system 100 includes a plurality of users and a personalization engine 110. The users perform multiple searches on the personalization engine 110 over time. Search contexts 105 indicate numerous data elements of the multiple searches performed by the users.

The personalization engine 110 processes and cumulates the search contexts 105. The personalization engine 110 includes of a user intent data hub 120, a user clustering process 130, a navigation-type clustering and search process 140, a learning process 150, and a results mapping process 160. The personalization engine 110 stores the data elements of the search contexts 105 in the user intent data hub 120.

The user clustering process 130 detects user intents patterns from the data elements of the user intent data hub 120. As a result, the user clustering process 130 generates a plurality of user clusters for respective groups of users having specific common intent in search and discovery.

The user intent data hub 120 is a collection of data elements 125 relevant to user intent from various data sources as organized for distribution, sharing, and subsetting, in the personalization engine 110. The data elements 125 of the user intent data hub 120 may be, but are not limited to, profile data of the users, 360 degree personality traits/insights of the users, computing devices of the users, transaction records, etc., as gathered from various data sources. Data sources may include, but are not limited to, cookies/browsing histories, purchase/online transaction histories, sequences of searches, current contexts of the searches as derived from activities and interactions of the users, social media footprint data of the users, envelope information of the searches including time of the searches and locations of the users, clickstreams representing click activities on the screen by the users, survey data/call center data generated in association with the activities of the users.

The navigation-type clustering and search process 140 performs searches, detects patterns in navigation activities and/or search queries, and identifies a plurality of navigation-type clusters for respective groups of specific navigation patterns. Examples of the user clusters and the navigation-type clusters are presented in FIG. 2 and corresponding description.

The learning process 150 trains the personalization engine 110 to determine useful facets with respective usefulness factors for the user clusters and the navigation-type clusters by machine learning.

A user 101 in the plurality of users submits a query 107 to the personalization engine 110. The query 107 is a request for information that may be obtained via search and/or discovery. The results mapping process 160 associates the user 101 to one of the user clusters as determined by the user clustering process 130. Similarly, the results mapping process 160 associates the query 107 and/or a navigation intent of the query 107 to one of the navigation-type clusters as determined by the navigation-type clustering and search process 140. The personalization engine 110 selects useful facets 173 according to the respective usefulness factors based on the user cluster for the user 101 and the navigation-type cluster for the query 107. The personalization engine 110 presents the useful facets 173 to the user 101 and optionally receives feedback 175. The personalization engine 110 produces facets-scored results 199 by scoring and ranking search results responsive to the query 107 based on the useful facets 173, and subsequently presents the facets-scored results 199 to the user 101.

In contrast with conventional faceting utilizing static and preconfigured facets and instances, the personalization engine 110 implements dynamic and personalized faceting as well as dynamic search index based on the personalized faceting. The personalization engine 110 implements dynamic and personalized faceting based on comprehensive analysis of the users in the context of information requests made by the users, including search and/or discovery, such that the users may acquire optimal results for individual users corresponding to the information requests with targeted browsing and navigation, which may contribute to better user experience and increased sales of goods and services from content nodes employing the personalization engine 110.

Upon receiving the query 107 from the user 101, the personalization engine 110 automatically presents facets and facet options that match one or more user cluster and one or more navigation-type cluster corresponding to the user 101 and the query 107, respectively. Users in different user clusters may receive distinctive facets and associated results with a same query by the same content node, as the personalization engine 110 attempts to identify the results by use of personalized facets and associated values. Similarly, the facets presented in the same navigation state for the same user may vary based on context and need of the user as dynamically analyzed each time. Further, the personalization engine 110 dynamically updates search indices of the content node according to trends of the dynamically personalized facets and associated values based on the user clusters and the navigation-type clusters such that future searches and discoveries may be more targeted and focused with similar users and/or information requests.

Figure 2:
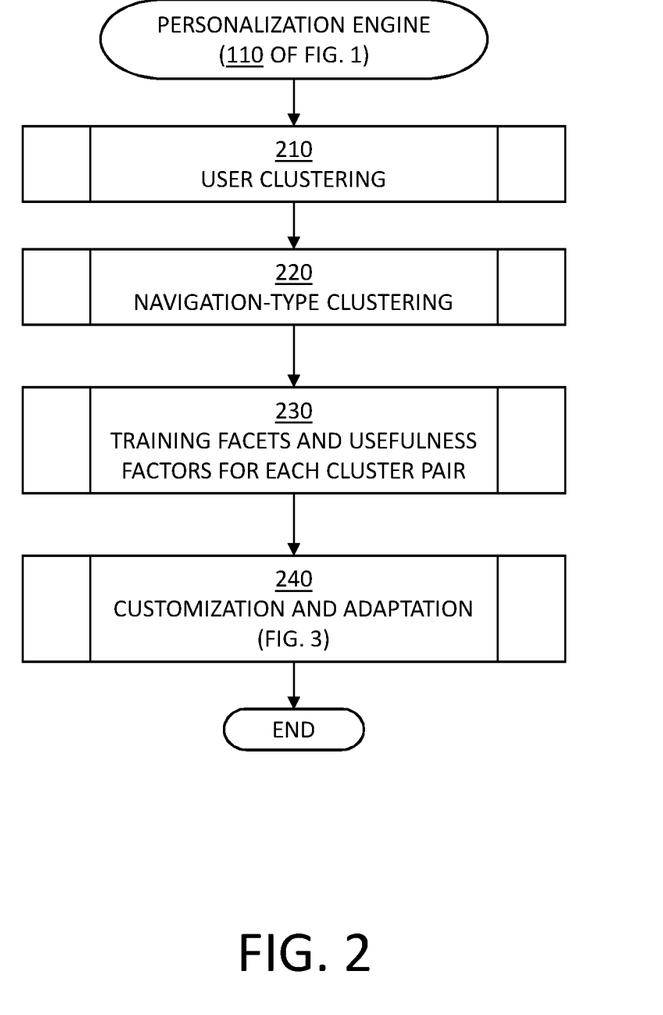
FIG. 2 depicts a flowchart performed by the personalization engine, in accordance with one or more embodiments set forth herein.

FIG. 2 depicts a flowchart performed by the personalization engine 110 of FIG. 1, in accordance with one or more embodiments set forth herein.

In block 210, the personalization engine 110 derives user clusters based on intent/need of the users by use of the data elements stored in the user intent data hub 120 and by use of the user clustering process 130. In preparation prior to block 210, the personalization engine 110 captures data of the search contexts 105, structured or unstructured and directly or indirectly associated with the users, from previously performed searches, activities and adds the data elements 125 in the user intent data hub 120 according to a preconfigured data model for fast and effective analysis of the data elements 125. The personalization engine 110 derives needs, context and intent based on application of Natural Language Processing (NLP) Text Analytics, psycholinguistic analytics, and descriptive analytics, etc. The personalization engine 110 groups users with similar needs, context and intent together by applying clustering models on various data relevant to the users. As a result, the personalization engine 110 derives the user clusters per dimension and value. Then the personalization engine 110 proceeds with block 220.

In certain embodiments of the present invention, the personalization engine 110 employs a k-means clustering algorithm or other types of unsupervised learning algorithms to find the user clusters in block 210, wherein k is a number of the user clusters. For the k-means clustering, the personalization engine 110 may employ attributes detectable from the data elements 125 of the user intent data hub 120, including, but not limited to, profile data of the users, personality traits/insights of the users, types of computing devices of the users, etc. Examples of the profile data may include basic demographic data, age, geographic location, gender, group memberships, occupation, and/or numerous socioeconomic categories of individual users. Classifications based on psychographics and chronotype, as in conventional marketing analysis, may also be utilized in discovering the user clusters. For example, the personality traits may include, but are not limited to, openness, neuroticism, conscientiousness, agreeableness, extraversion, harmony, self-transcendence, etc., as offered by commercially available personality analytics services such as IBM Watson™ Personality Insights. (IBM Watson is a trademark of International Business Machines Corporation in the United States and other countries.) The psychographic classification may include personalities, values, opinions, attitudes, as well as interests and lifestyles of the individual users, etc., such as fitness enthusiast, reader, gardener, vegetarian, etc.

In an exemplary use scenario of the personalization engine 110, two (2) users, User A and User B, performed searches for technology articles by use of the personalization engine 110. The personalization engine 110 determines that, based on contexts of searches and activities performed by User A, User A is motivated to find out activities of competitors of User A. The personalization engine 110 also determines that, based on contexts of searches and activities performed by User B, User B is motivated to learn the history of the technology. Prior to block 210, the personalization engine 110 processes the search contexts 105 for User A and User B respectively and creates respectively corresponding data elements 125 in the user intent data hub 120. In block 210 of the same embodiments, the personalization engine 110 specifies two (2) user clusters, Cluster 1 and Cluster 2, based on respective personality traits and motivations/interests of User A and User B. Cluster 1 includes users having personality traits of high degree of openness, neuroticism and extraversion, who are motivated by competition. Cluster 2 includes users having personality traits of high degree of agreeableness, conscientiousness and analytical skill who are interested in history.

In block 220, the personalization engine 110 derives navigation-type clusters based on search queries and/or navigation topics. The navigation-type clusters represent respective groups of general search behaviors of the users. Similar to the user clustering in block 210, the personalization engine 110 may utilize a k-means clustering algorithm or other types of unsupervised learning algorithms to find the navigation-type clusters. Then the personalization engine 110 proceeds with block 230.

In the same exemplary use scenario of the personalization engine 110 from block 210 wherein two (2) user clusters of Cluster 1 and Cluster 2 were specified, the personalization engine 110 finds two (2) kinds of search queries/navigation patterns in block 220. Cluster A of the navigation-type cluster represents navigation patterns of click on results and keywords relevant to competing technologies such as Java®, .NET™, etc. (Java is a registered trademark of Oracle and/or its affiliates in the United States and other countries; .NET is a trademark of Microsoft Corporate in the United States and other countries.) Also, Cluster B of the navigation-type cluster represents navigation patterns of click on results and keywords relevant to historical technologies such as C++, Java, etc.

In block 230, the personalization engine 110 trains the personalization engine 110 in order to determine useful facets with corresponding usefulness factors for each pair respectively selected from the user clusters and the navigation-type clusters. The personalization engine 110 may use the learning process 150 in reviewing search/navigation history to select the useful facets that are associated with successful searches/navigations along with the search terms/topics. The searches/navigation histories are examined by use of user response data indicating how successful search results are, as provided by user comments on the search results, by long click on links, etc. Then the personalization engine 110 proceeds with block 240.

In the same exemplary use scenario of the personalization engine 110 from blocks 210 and 220, wherein the user clusters of Cluster 1 and Cluster 2 as well as the navigation-type clusters of Cluster A and Cluster B were specified, the personalization engine 110 finds useful factors to aid the users with their navigations. For users in Cluster 1, the personalization engine 110 assesses facets related to competing technologies to be most useful and assigns a usefulness factor of ten (10) on a scale of one (1) to ten (10). However, for the same users in Cluster 1, the personalization engine 110 assesses facets related to history of technology to be not of much use and assigns a usefulness factor of two (2) on a scale of one (1) to ten (10). Similarly, for users in Cluster 2, the personalization engine 110 assesses facets related to competing technologies to be minimally useful and assigns a usefulness factor of three (3) on a scale of one (1) to ten (10). However, for the same users in Cluster 2, the personalization engine 110 assesses facets related to historical articles on technology to be highly useful and assigns a usefulness factor of nine (9) on a scale of one (1) to ten (10).

In block 240, the personalization engine 110 dynamically customizes facets of a query and rebuilds search indices to reflect the result from the customization. The personalization engine 110 customizes the query with the useful facets with corresponding usefulness factors as selected by use of the user clusters and the navigation-type clusters configured in preceding blocks 210 through 230. Details of block 240 are presented in FIG. 3 and corresponding description. Then the personalization engine 110 may iterate block 240 for a next query.

In certain embodiments of the present invention, blocks 210 through 230 may be performed, periodically or upon triggering events, to update the user clusters and the navigation-type clusters.

Figure 3:
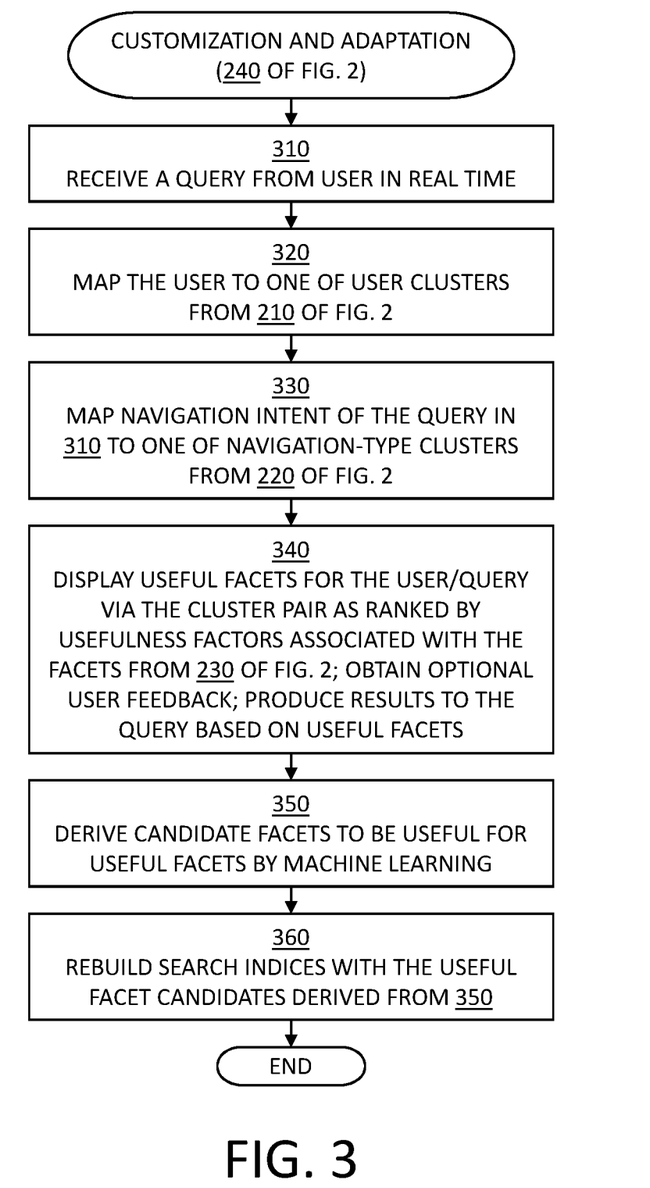
FIG. 3 depicts a detailed flowchart for customization and adaptation performed by the personalization engine, in accordance with one or more embodiments set forth herein.

FIG. 3 depicts a detailed flowchart for customization and adaptation in block 240 of FIG. 2, performed by the personalization engine 110 of FIG. 1, in accordance with one or more embodiments set forth herein.

In block 310, the personalization engine 110 receives the query 107 from the user 101 in real time. Then the personalization engine 110 proceeds with block 320.

In block 320, the personalization engine 110 maps the user 101 to a user cluster from the user clusters that had been previously specified. The personalization engine 110 maps the user cluster that best fit for the user 101, according to current intent and context of the user 101 based on attributes and data sources similar to data elements employed in configuring the user clusters from block 210 of FIG. 2. Then the personalization engine 110 proceeds with block 330.

In the same exemplary use scenario of the personalization engine 110 from FIG. 2, wherein the user clusters of Cluster 1 and Cluster 2 as well as the navigation-type clusters of Cluster A and Cluster B were specified, User X requests a search with Query "which technology is better java or dotnet" via the personalization engine 110 in block 310. "java" indicates Java, and "dotnet" indicates .NET, respectively. Subsequently, in block 320, the personalization engine 110 maps User X to Cluster 1 user cluster based on various need/intent/personality traits data.

In block 330, the personalization engine 110 maps the navigation intent of the received query 107 to one of the navigation-type clusters as specified from block 220 of FIG. 2. Then the personalization engine 110 proceeds with block 340.

In the same exemplary use scenario of the personalization engine 110 from FIG. 2, the personalization engine 110 maps the Query to Cluster A navigation-type cluster that represents navigation-type related to competing technologies in block 330.

In block 340, the personalization engine 110 displays the useful facets 173 for the pair of the user cluster and the navigation-type cluster that is mapped for the user 101 and the query 107 from blocks 320 and 330. The personalization engine 110 displays the useful facets 173 as ranked in order of the usefulness factors from block 230 of FIG. 2. The personalization engine 110 may obtain a feedback 175 on the displayed useful facets 173 from the user 101, in cases where the user 101 provide the feedback 175. The personalization engine 110 subsequently produces, to the user 101, facets-scored results 199 responsive to the query 107, based on the useful facets 173, with or without the feedback 175. Then the personalization engine 110 proceeds with block 350.

In certain embodiments of the present invention, the usefulness factors of respective useful facets may be quantified in a scale of one (1) to ten (10), and each number indicates corresponding level of usefulness of each useful facet for the user/navigation-type cluster. In the same exemplary use scenario of the personalization engine 110 from FIG. 2, the personalization engine 110 selects, ranks and presents the useful facets 173 for Cluster 1 user cluster and Cluster A navigation-type cluster for User X searching by Query. The personalization engine 110 ranks facets relevant to competition within and/or amongst technologies highly as more useful for guiding User X to navigate through search results of Query, and displays high-ranked facets from the top for User X such that User X may find information sought out with Query with the most likelihood.

In block 350, the personalization engine 110 derives candidate facets that may be useful facets to the user clusters by machine learning, based on keyword searches, queries, reviews, user activities and interactions etc. Then the personalization engine 110 proceeds with block 360.

In block 360, the personalization engine 110 rebuilds, fully or in part, a search index for contents with the candidate facets and associated values, as well as additional dimensions derived from block 350, in order to optimize future searches by use of the candidate facets that are potentially useful for searches. Then the personalization engine 110 terminates processing triggered by the received query in block 310.

In certain embodiments of the present invention, the search index may be configured with two (2) or more additional fields of records in order to incorporate new facets and the associated values, respectively. Also results for search and navigation may be configured with two (2) or more additional parameters in order to incorporate the new facets and the associated values, respectively, as derived by the personalization engine 110. Accordingly, searches performed through the personalization engine 110 may automatically return facets including the new facets ranked by usefulness, as personalized for each user when searches and navigation queries are invoked by a user belonging to the cluster for which these new facets are relevant. In the same embodiments, the personalization engine 110 may instantiate facet-value pairs in additional fields/parameters with data values acquired from machine learning, user feedback on facet suggestions, etc., in the fully or partially rebuilt search index, such that the personalization engine 110 dynamically customizes and presents facets useful for a user presently searching and navigating.

Certain embodiments of the present invention may offer various technical computing advantages, including dynamic and personalized faceting of search/discovery based on user type, needs, context as well as intent at the time of information request. Users of the personalization engine 110 are clustered into user clusters based on the user type, needs, context and intent of an information request based on comprehensive aspects of users. Also navigation activities of the users are orthogonally clustered into navigation-type clusters based on browsing activities, etc. Certain embodiments of the present invention implement a dynamic mapping of a user and a query to a pair of a user cluster and a navigation-type cluster as derived, then values of respective facets are evaluated for respective usefulness to each pair of clusters, in order to provide targeted search/discovery result to the user. Further, certain embodiments of the present invention cumulate the facets by machine learning and integrate the dynamically derived facets and evaluated facet values with search indices such that future search/discovery requests may be efficiently performed for existing types of cluster pairs.

Figure 4:
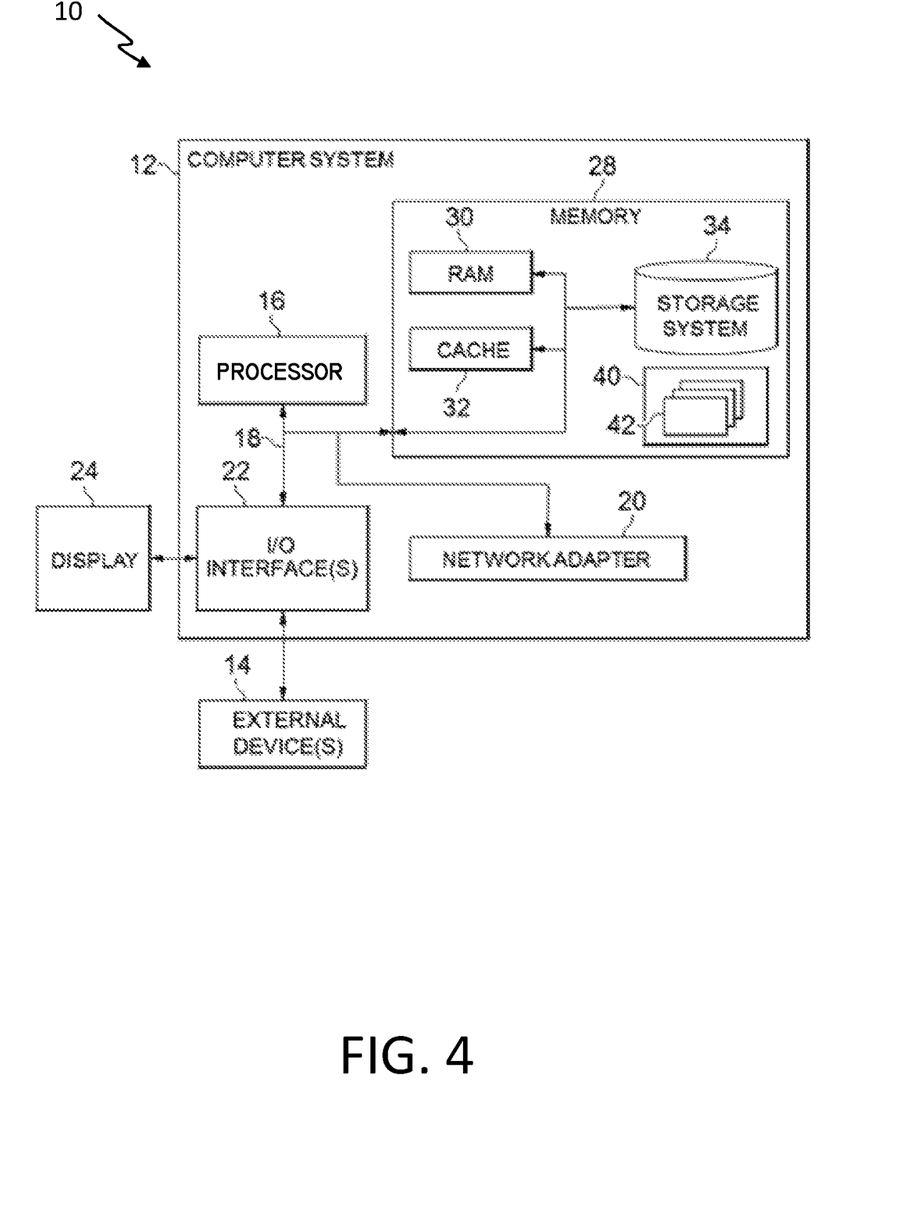
FIG. 4 depicts a cloud computing node according to an embodiment of the present invention.
Figure 5:
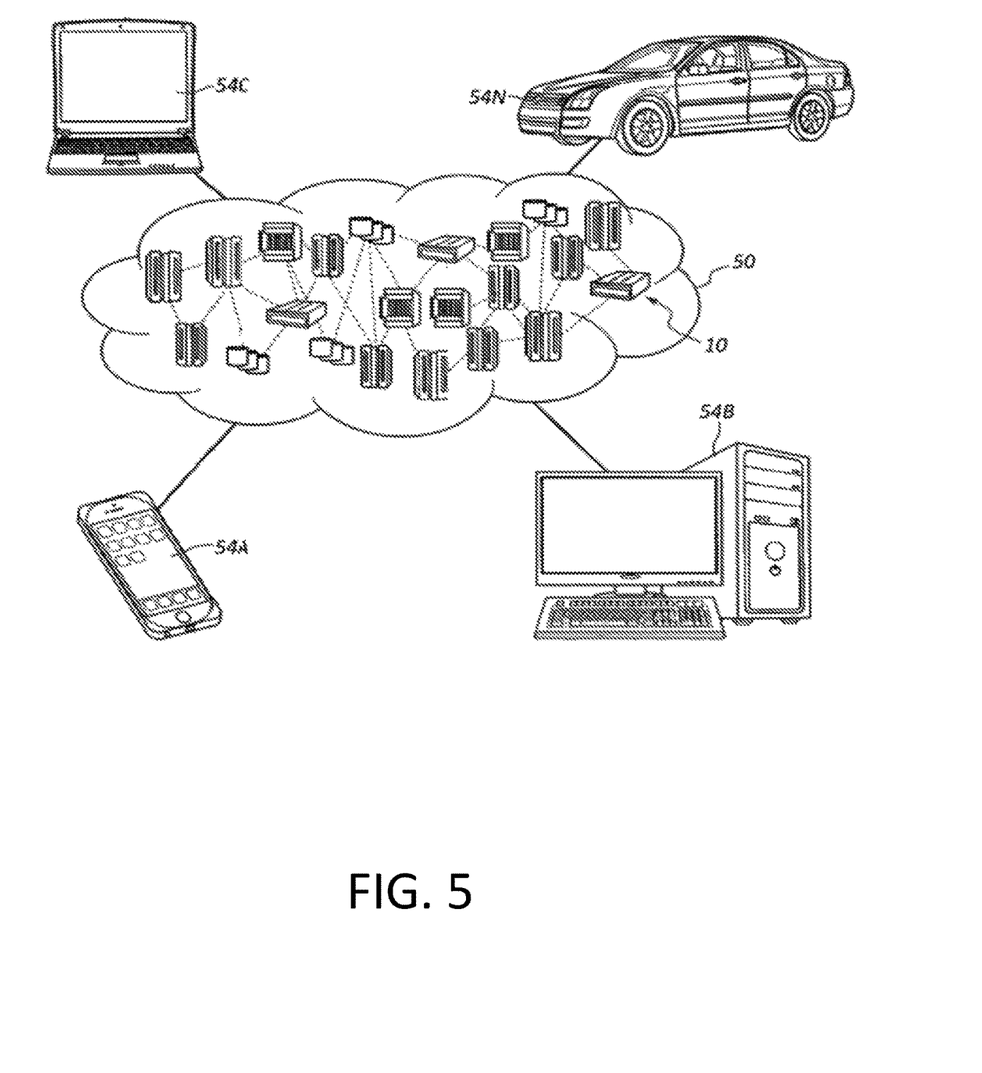
FIG. 5 depicts a cloud computing environment according to an embodiment of the present invention.
Figure 6:
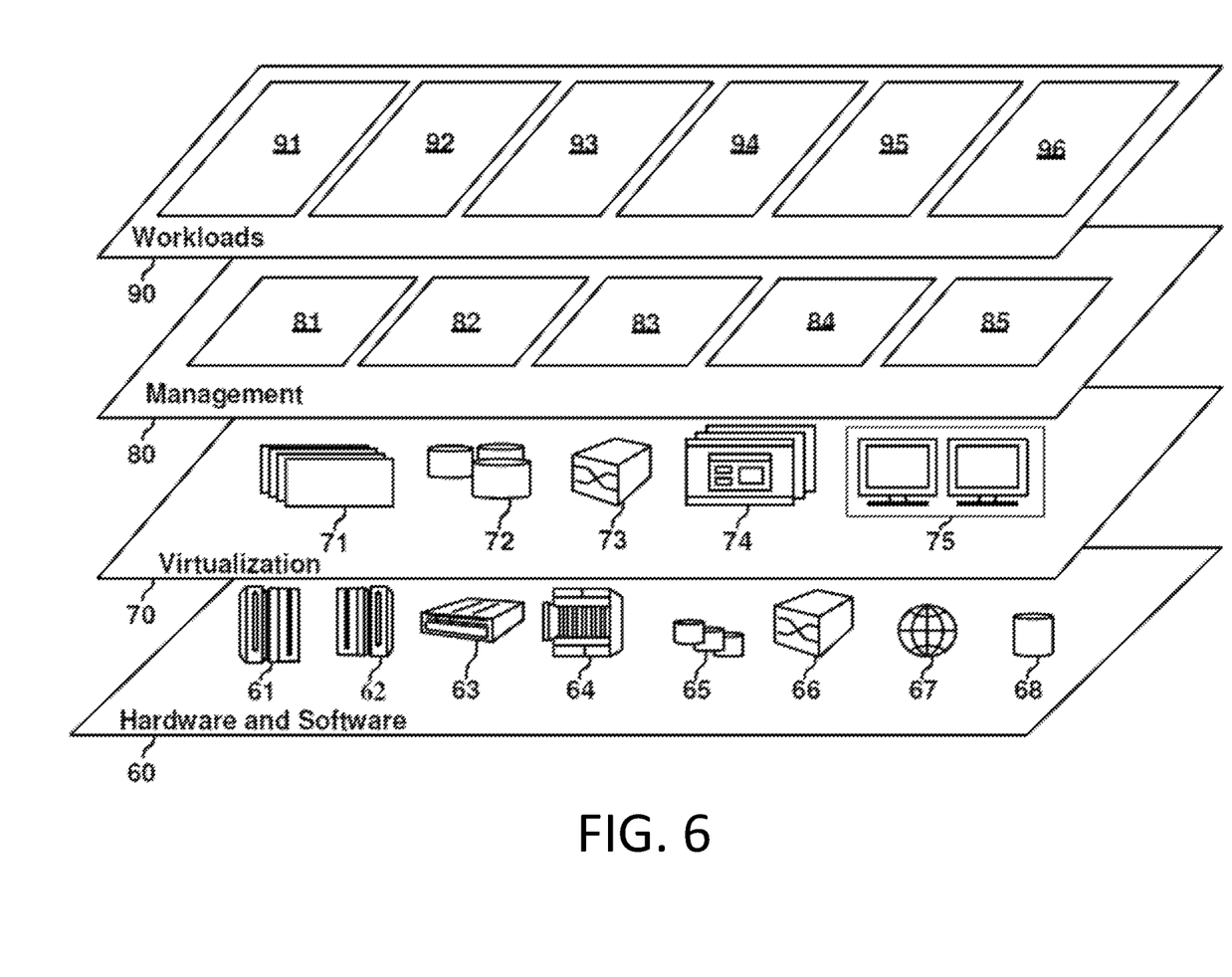
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the personalization engine 110 of FIG. 1. Program processes 42, as in the personalization engine 110, the user clustering process 130, the navigation-type clustering and search process 140, the learning process 150, and the results mapping process 160 of FIG. 1, respectively, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the personalization engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for personalizing a query by use of dynamic faceting, comprising:

identifying, by one or more processor of a computer, at least one user cluster based on respective intent from multiple requests for information including searches and discoveries, wherein each intent corresponds to a specific characterization of users in respective user cluster;

specifying at least one navigation-type cluster based on respective navigation pattern from the multiple requests for information;

training, by machine learning, at least one facet and usefulness factors respectively associated with the at least one facet, as determined for each pair of a user cluster and a navigation-type cluster, wherein the user cluster is one of the at least one user cluster and the navigation-type cluster is one of the at least one navigation-type cluster, and presenting the at least one facet to at least one user belonging to the user cluster;

customizing a query received from a user by use of one or more selected facet and corresponding associated usefulness factor, the one or more selected facet corresponding to a selected pair from the at least one user cluster and the at least one navigation-type cluster such that the user receives a response most appropriate for an intent of the query; and producing results responsive to the query, wherein facets amongst the at least one facet in the results are scored according to the usefulness factor respectively corresponding to the one or more selected facet.

2. The computer implemented method of claim 1, the customizing comprising:

mapping the user to a first user cluster from the at least one user cluster, wherein the first user cluster represents attributes most similar to the user amongst the at least one user cluster;

associating the query to a first navigation-type cluster from the at least one navigation-type cluster, wherein the first navigation-type cluster represents attributes most similar to the intent of the query amongst the at least one navigation-type cluster; and displaying, to the user, the one or more facet corresponding to the selected pair of the first user cluster and the first navigation-type cluster, wherein the one or more selected facet is ranked according to the one or more usefulness factor respectively corresponding to the one or more selected facet.

3. The computer implemented method of claim 2, further comprising:
receiving, from the user, a feedback on the one or more selected facet corresponding to the selected pair of the first user cluster and the first navigation-type cluster such that the respective usefulness factors of the one or more selected facet may be adjusted based on the feedback.

4. The computer implemented method of claim 1, the training comprising:
reviewing successful results including search histories, navigation histories, search terms and search topics, by machine learning, for the one or more selected facet and the usefulness factor respectively associated with the one or more selected facet, wherein the successful results are determined by various user responses including user comments and long-click on the results.

5. The computer implemented method of claim 1, further comprising:
deriving candidate facets to be the one or more selected facet for the selected pair from the at least one user cluster and the at least one navigation-type cluster by machine learning; and
rebuilding one or more search index partially or fully with the candidate facets such that another query similar to the query received from another user similar to the user can be more efficiently processed with the rebuilt one or more search index, wherein the rebuilt search index includes the candidate facets as well as the one or more selected facet.

6. The computer implemented method of claim 1, wherein the respective intent for determining the at least one user cluster is selected from the group consisting of: personality traits, demographic data, ages, geographic locations, gender, group memberships, occupations, psychographic, chronotype, and/or socioeconomic categories of the users, device types, transaction histories, and combinations thereof.

7. The computer implemented method of claim 1, wherein the respective navigation pattern for determining the at least one navigation-type cluster is selected from the group consisting of: navigation activities and search queries from various data sources including one of cookies, browsing histories, purchase histories, online transaction histories, sequences of searches, current contexts of searches as derived from previous activities and interactions of the users, social media footprint data of the users, envelope information of the searches including time of the searches and locations of the users, clickstreams representing click activities on the screen by the users, survey data, call center data generated in association with the activities of the users, and combinations thereof.

8. A computer program product comprising:
a computer readable storage medium readable by one or more processor and storing instructions for execution by the one or more processor for performing a method for personalizing a query by use of dynamic faceting, comprising:
identifying, by the one or more processor, at least one user cluster based on respective intent from multiple requests for information including searches and discoveries, wherein each intent corresponds to a specific characterization of users in respective user cluster;
specifying at least one navigation-type cluster based on respective navigation pattern from the multiple requests for information;
training, by machine learning, at least one facet and usefulness factors respectively associated with the at least one facet, as determined for each pair of a user cluster and a navigation-type cluster, wherein the user cluster is one of the at least one user cluster and the navigation-type cluster is one of the at least one navigation-type cluster, and presenting the at least one facet to at least one user belonging to the user cluster;
customizing a query received from a user by use of one or more selected facet and corresponding associated usefulness factor, the one or more selected facet corresponding to a selected pair from the at least one user cluster and the at least one navigation-type cluster such that the user receives a response most appropriate for an intent of the query; and
producing results responsive to the query, wherein facet amongst the at least one facet in the results are scored according to the usefulness factor respectively corresponding to the one or more selected facet.

9. The computer program product of claim 8, the customizing comprising:
mapping the user to a first user cluster from the at least one user cluster, wherein the first user cluster represents attributes most similar to the user amongst the at least one user cluster;
associating the query to a first navigation-type cluster from the at least one navigation-type cluster, wherein the first navigation-type cluster represents attributes most similar to the intent of the query amongst the at least one navigation-type cluster; and
displaying, to the user, the one or more facet corresponding to the selected pair of the first user cluster and the first navigation-type cluster, wherein the one or more selected facet is ranked according to the one or more usefulness factor respectively corresponding to the one or more selected facet.

10. The computer program product of claim 9, further comprising:
receiving, from the user, a feedback on the one or more selected facet corresponding to the selected pair of the first user cluster and the first navigation-type cluster such that the respective usefulness factors of the one or more selected facet may be adjusted based on the feedback.

11. The computer program product of claim 8, the training comprising:
reviewing successful results including search histories, navigation histories, search terms and search topics, by machine learning, for the one or more selected facet and the usefulness factor respectively associated with the one or more selected facet, wherein the successful results are determined by various user responses including user comments and long-click on the results.

12. The computer program product of claim 8, further comprising:
deriving candidate facets to be the one or more selected facet for the selected pair from the at least one user cluster and the at least one navigation-type cluster by machine learning; and rebuilding one or more search index partially or fully with the candidate facets such that another query similar to the query received from another user similar to the user can be more efficiently processed with the rebuilt one or more search index, wherein the rebuilt search index includes the candidate facets as well as the one or more selected facet.

13. The computer program product of claim 8, wherein the respective intent for determining the at least one user cluster is selected from the group consisting of: personality traits, demographic data, ages, geographic locations, gender, group memberships, occupations, psychographic, chronotype, and/or socioeconomic categories of the users, device types, transaction histories, and combinations thereof.

14. The computer program product of claim 8, wherein the respective navigation pattern for determining the at least one navigation-type cluster is selected from the group consisting of: navigation activities and search queries from various data sources including one of cookies, browsing histories, purchase histories, online transaction histories, sequences of searches, current contexts of searches as derived from previous activities and interactions of the users, social media footprint data of the users, envelope information of the searches including time of the searches and locations of the users, clickstreams representing click activities on the screen by the users, survey data, call center data generated in association with the activities of the users, and combinations thereof.

15. A system comprising:
a memory;
one or more processor in communication with memory; and
program instructions executable by the one or more processor via the memory to perform a method for personalizing a query by use of dynamic faceting, comprising:
identifying, by the one or more processor, at least one user cluster based on respective intent from multiple requests for information including searches and discoveries, wherein each intent corresponds to a specific characterization of users in respective user cluster;
specifying at least one navigation-type cluster based on respective navigation pattern from the multiple requests for information;
training, by machine learning, at least one facet and usefulness factors respectively associated with the at least one facet, as determined for each pair of a user cluster and a navigation-type cluster, wherein the user cluster is one of the at least one user cluster and the navigation-type cluster is one of the at least one navigation-type cluster, and presenting the at least one facet to at least one user belonging to the user cluster;
customizing a query received from a user by use of one or more selected facet and corresponding associated usefulness factor, the one or more selected facet corresponding to a selected pair from the at least one user cluster and the at least one navigation-type cluster such that the user receives a response most appropriate for an intent of the query; and
producing results responsive to the query, wherein facets amongst the at least one facet in the results are scored according to the usefulness factor respectively corresponding to the one or more selected facet.

16. The system of claim 15, the customizing comprising:
mapping the user to a first user cluster from the at least one user cluster, wherein the first user cluster represents attributes most similar to the user amongst the at least one user cluster;
associating the query to a first navigation-type cluster from the at least one navigation-type cluster, wherein the first navigation-type cluster represents attributes most similar to the intent of the query amongst the at least one navigation-type cluster; and
displaying, to the user, the one or more facet corresponding to the selected pair of the first user cluster and the first navigation-type cluster, wherein the one or more selected facet is ranked according to the one or more usefulness factor respectively corresponding to the one or more selected facet.

17. The system of claim 16, further comprising:
receiving, from the user, a feedback on the one or more selected facet corresponding to the selected pair of the first user cluster and the first navigation-type cluster such that the respective usefulness factors of the one or more selected facet may be adjusted based on the feedback.

18. The system of claim 15, the training comprising:
reviewing successful results including search histories, navigation histories, search terms and search topics, by machine learning, for the one or more selected facet and the usefulness factor respectively associated with the one or more selected facet, wherein the successful results are determined by various user responses including user comments and long-click on the results.

19. The system of claim 15, further comprising:
deriving candidate facets to be the one or more selected facet for the selected pair from the at least one user cluster and the at least one navigation-type cluster by machine learning; and
rebuilding one or more search index partially or fully with the candidate facets such that another query similar to the query received from another user similar to the user can be more efficiently processed with the rebuilt one or more search index, wherein the rebuilt search index includes the candidate facets as well as the one or more selected facet.

20. The system of claim 15,
wherein the respective intent for determining the at least one user cluster is selected from the group consisting of: personality traits, demographic data, ages, geographic locations, gender, group memberships, occupations, psychographic, chronotype, and/or socioeconomic categories of the users, device types, transaction histories, and combinations thereof, and
wherein the respective navigation pattern for determining the at least one navigation-type cluster is selected from the group consisting of: navigation activities and search queries from various data sources including one of cookies, browsing histories, purchase histories, online transaction histories, sequences of searches, current contexts of searches as derived from previous activities and interactions of the users, social media footprint data of the users, envelope information of the searches including time of the searches and locations of the users, clickstreams representing click activities on the screen by the users, survey data, call center data generated in association with the activities of the users, and combinations thereof.

* * * * *